United States Patent
Matsunaga

(10) Patent No.: US 9,582,790 B2
(45) Date of Patent: Feb. 28, 2017

(54) IMAGE PROCESSING APPARATUS AND IMAGE PROCESSING METHOD

(71) Applicant: CANON KABUSHIKI KAISHA, Tokyo (JP)

(72) Inventor: Daisuke Matsunaga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/598,088

(22) Filed: Jan. 15, 2015

(65) Prior Publication Data

US 2015/0206115 A1 Jul. 23, 2015

(30) Foreign Application Priority Data

Jan. 20, 2014 (JP) .................................. 2014-007915

(51) Int. Cl.
G06K 15/00 (2006.01)
G06Q 20/14 (2012.01)
G06K 15/02 (2006.01)
G07F 17/42 (2006.01)

(52) U.S. Cl.
CPC ....... G06Q 20/145 (2013.01); G06K 15/1867 (2013.01); G06K 15/4005 (2013.01); G07F 17/42 (2013.01)

(58) Field of Classification Search
CPC .................................................. G06Q 20/145
USPC .......................................... 358/1.15, 1.9, 2.1
See application file for complete search history.

(56) References Cited

U.S. PATENT DOCUMENTS 8,411,322 B2 * 4/2013 Kubota .................... H04N 1/38
358/1.9
2008/0037059 A1 * 2/2008 Inoue .................... G06F 3/1208
358/1.15

FOREIGN PATENT DOCUMENTS

| JP | 2001-078036 A | 3/2001 |
| JP | 2007-129449 A | 5/2007 |
| JP | 2012-142761 A | 7/2012 |

* cited by examiner

Primary Examiner — Lam Nguyen
(74) Attorney, Agent, or Firm — Canon U.S.A., Inc. IP Division

(57) ABSTRACT

A printing apparatus includes white and gray text determination units and a setting unit to charge a color printing fee where a pixel for which a color printing flag is set is present in an input image, and to charge a black-and-white printing fee where a pixel for which the color printing flag is set is not present in an input image. The white determination unit determines whether a focused pixel in the input image is a white pixel. The gray text determination unit determines whether the focused pixel constitutes a gray text. Where the focused pixel is determined to constitute a gray text or be a white pixel, the setting unit sets a black-and-white printing flag for the focused pixel and, where the focused pixel is determined to neither constitute a gray text nor be a white pixel, the color printing flag is set for the focused pixel.

10 Claims, 9 Drawing Sheets

FIG.6

| OUTPUT MODE / DETERMINATION METHOD | DETERMINATION IN HOST COMPUTER | DETERMINATION IN IMAGE PROCESSING APPARATUS |
|---|---|---|
| COLOR | COLOR DOCUMENT (*1) | VALID |
| AUTOMATIC DETERMINATION | COLOR DOCUMENT (*1) OR MONOCHROME DOCUMENT (*2) | VALID OR INVALID |
| MONOCHROME | MONOCHROME DOCUMENT (*2) | INVALID |

FIG.8

|  | GRAY COMPENSATION FLAG: ON | GRAY COMPENSATION FLAG: OFF |
|---|---|---|
| WHITE PIXEL (R = G = B = 255) | MONOCHROME PIXEL | MONOCHROME PIXEL |
| GRAY PIXEL (R = G = B) | MONOCHROME PIXEL | COLOR PIXEL |
| BLACK PIXEL (R = G = B = 0) | MONOCHROME PIXEL | COLOR PIXEL |
| COLOR PIXEL | COLOR PIXEL | COLOR PIXEL |

GRAY-SHADED OBJECT 901 INDICATES THAT OBJECT 901 IS COLOR OBJECT.
DASHED LINES OF OBJECT 903 INDICATE THAT OBJECT 901 CANNOT BE SEEN BEHIND OBJECT 902.

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

A technique for automatically switching between color printing and monochrome (black-and-white) printing has been known (e.g., Japanese Patent Application Laid-Open No. 2007-129449). The technique discussed in Japanese Patent Application Laid-Open No. 2007-129449 will be described in detail below.

A printer driver determines whether a color object is included in red, green, and blue (RGB) document data. If at least one color object is included, the printer driver determines that the RGB document data is color. If no color object is included, the printer driver determines that the RGB document data is monochrome. The printer driver sends the determination result along with the RGB document data to a printer.

Having received the RGB document data, the printer bitmaps the RGB document data. This generates RGB bitmap data.

(1) If the received determination result indicates that the RGB document data is monochrome, the printer converts the generated RGB bitmap data into single-K-color bitmap data, and prints the single-K-color bitmap data. That is, the printer prints the converted single-K-color bitmap data using only K ink or K toner. "K" represents black. In this case, a monochrome printing fee is charged for the printing of the document.

(2) If, on the other hand, the received determination result indicates that the RGB document data is color, the printer determines, in the RGB bitmap data, which pixel is to be printed in cyan, magenta, yellow, and black (CMYK) colors and which pixel is to be printed in a single K color. Specifically, the following processing is performed.

(A) First, the printer generates attribute bitmap data indicating the attribute of an object to which each pixel belongs. The attribute is any one of, for example, "text", "graphic", "image", and "nothing".

(B) Then, the printer sets an attribute "single K color" for a pixel which has the attribute "text" or "graphic" and in which R=G=B. On the other hand, the printer sets an attribute "CMYK" for other pixels.

(C) The RGB values of the pixel for which the attribute "single K color" has been set are converted into the values of a single K color (C=M=Y=0, and K can be any value), and then, the pixel is printed. Further, the RGB values of the pixel for which the attribute "CMYK" has been set are converted into the values of CMYK colors (at least one of C, M, and Y is not 0 except for the case where R=G=B=255, and K can be any value), and then, the pixel is printed. "C" represents cyan, "M" represents magenta, and "Y" represents yellow.

(D) If there is at least one pixel having the attribute "CMYK", a color printing fee has been charged for the printing of the document. Further, if all the pixels have the attribute "single K color", a monochrome printing fee is charged for the printing of the document.

If the printer has not received the monochrome determination result from the printer driver, the printer charges a fee by performing processing similar to the processing in the above (2) and the subsequent steps, that is, the processing performed in the case where the color/monochrome determination result indicates that the RGB document data is color.

According to the above determination method, however, an undesirable color printing fee may be charged in some cases. Such cases will be described using an example illustrated in FIG. 1. FIG. 1 illustrates a document 101, which includes a white image object 102 (although the frame line of the image object 102 is black for illustrative purposes, the image object 102 is actually white), and black text objects 104 and 105. Since the document 101 includes the white image object 102, attribute bitmap data generated from the document 101 includes the attribute "image". Thus, the printer determines the document 101 as a color document. As a result, a color printing fee has been charged for the printing of such a document, despite the fact that there is no pixel to be printed in color. More specifically, although RGB-to-CMYK conversion is applied to the white image object 102, the obtained values would be C=M=Y=K=0 because, originally, R=G=B=255. Since RGB-to-single-K-color conversion is applied to the black text objects 104 and 105, the obtained values would be C=M=Y=0.

SUMMARY OF THE INVENTION

According to an aspect of the present invention, a printing apparatus to charge a color printing fee in a case where a pixel for which a color printing flag is set is present in an input image, and to charge a black-and-white printing fee in a case where a pixel for which the color printing flag is set is not present in an input image, includes a white determination unit configured to determine whether a focused pixel in the input image is a white pixel, a gray text determination unit configured to determine whether the focused pixel constitutes a gray text, and a setting unit configured to, in a case where the focused pixel is determined to constitute a gray text or be a white pixel, set a black-and-white printing flag for the focused pixel and, in a case where the focused pixel is determined to neither constitute a gray text nor be a white pixel, set the color printing flag for the focused pixel.

In a case where a focused pixel is determined to be not a white pixel, an image processing apparatus sets a color printing flag for the focused pixel in a case where the focused pixel is a black-and-white pixel and a photograph pixel. In a case where the focused pixel is determined to be a white pixel, the image processing apparatus sets a black-and-white printing flag for the focused pixel even in a case where the focused pixel is a photograph pixel. Further features of the present invention will become apparent from the following description of exemplary embodiments with reference to the attached drawings.

BRIEF DESCRIPTION OF THE DRAWINGS

FIG. 6 is a diagram illustrating relationships between an output mode setting, and color/monochrome determination results in the host computer and the image processing apparatus.

FIG. 8 is a diagram illustrating determination results of color/monochrome pixel determination made based on a pixel value and a gray compensation flag, in color/monochrome pixel determination.

DESCRIPTION OF THE EMBODIMENTS

Various exemplary embodiments, features, and aspects of the invention will be described in detail below with reference to the drawings. The configurations illustrated in the following exemplary embodiments are merely examples, and the present invention is not limited to the configurations illustrated in the figures.

Figure 2:
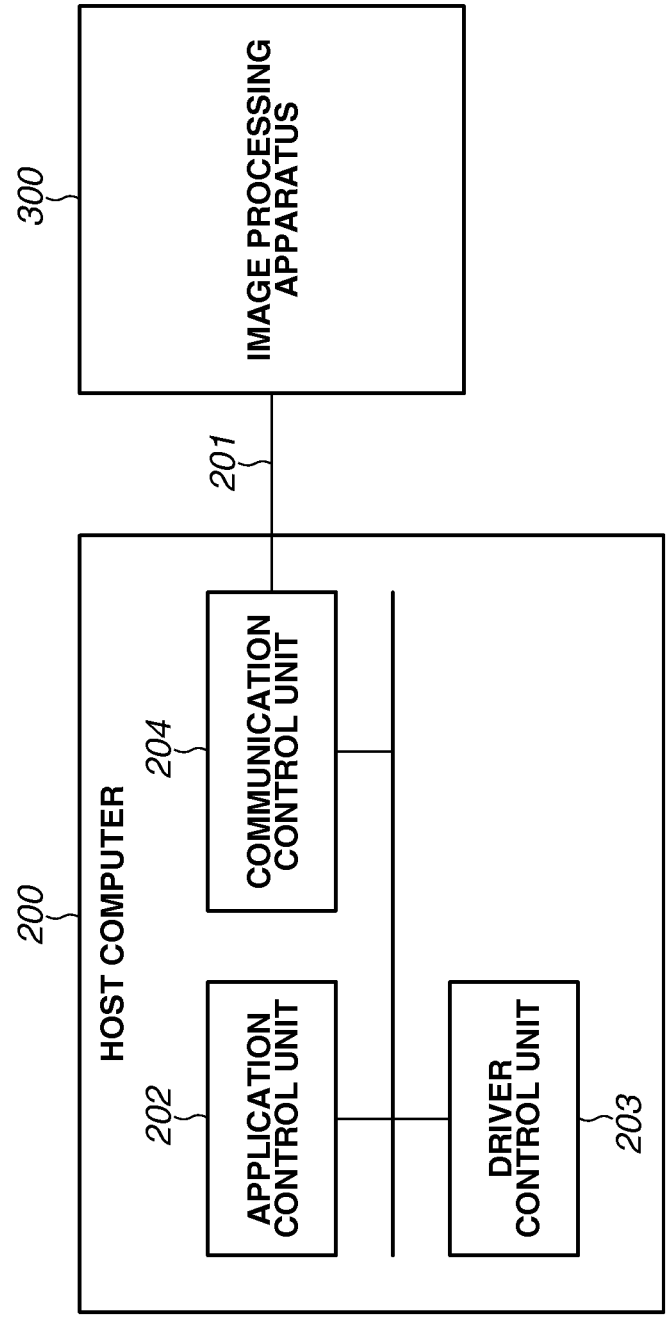
FIG. 2 is a diagram including blocks of a host computer.

FIG. 2 is a block diagram illustrating an example of an image processing system according to a first exemplary embodiment. The image processing system illustrated in FIG. 2 includes a host computer 200 and an image processing apparatus 300. The host computer 200 is connected to the image processing apparatus 300 via a network 201.

The host computer 200 includes an application control unit 202, a driver control unit 203, and a communication control unit 204. The application control unit 202 generates image data to be printed by the image processing apparatus 300. The driver control unit 203 converts the image data generated by the application control unit 202 to generate predetermined page description language (PDL) data. The communication control unit 204 transfers the PDL data generated by the driver control unit 203 and image processing parameters set by the driver control unit 203 to the image processing apparatus 300 via the network 201.

Figure 3:
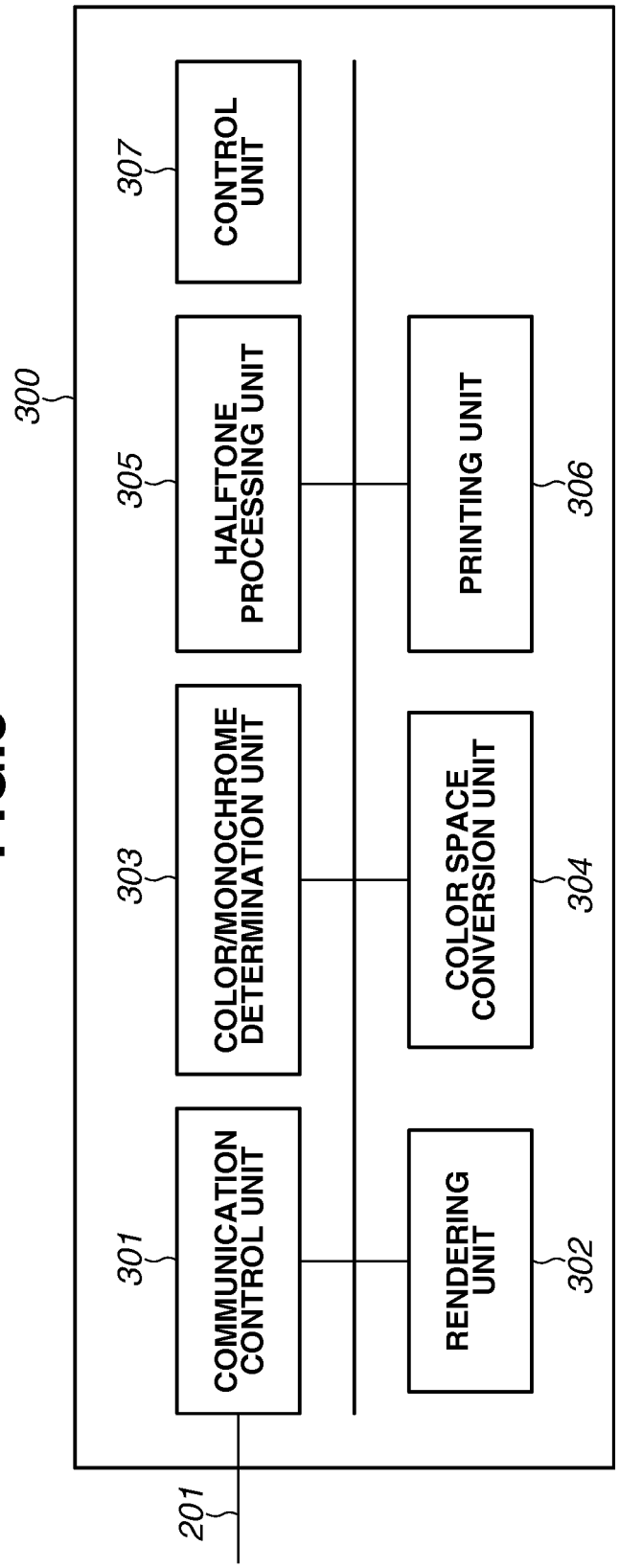
FIG. 3 is a block diagram illustrating a configuration example of an image processing apparatus.

FIG. 3 is a detailed block diagram illustrating the image processing apparatus 300 in FIG. 2. The image processing apparatus 300 performs printing using the PDL data sent from the host computer 200. The image processing apparatus 300 includes a communication control unit 301, a rendering unit 302, a monochrome/color determination unit 303, a color space conversion unit 304, a halftone processing unit 305, a printing unit 306, and a control unit 307.

The communication control unit 301 receives the PDL data and the image processing parameters transferred from the host computer 200 via the network 201. The rendering unit 302 renders the PDL data received by the communication control unit 301 to generate RGB format bitmap image data. The monochrome/color determination unit 303 determines whether the image bitmapped by the rendering unit 302 is a monochrome image or a color image. The color space conversion unit 304 converts the bitmap image data generated by the rendering unit 302 into CMYK format image data, taking into account the result of the determination by the monochrome/color determination unit 303.

The halftone processing unit 305 performs halftone processing on the CMYK format image data converted by the color space conversion unit 304. The printing unit 306 performs the print output of the halftone image obtained by the halftone processing by the halftone processing unit 305. The control unit 307 includes a central processing unit (CPU) (not illustrated), a random-access memory (RAM) (not illustrated), and a read-only memory (ROM)(not illustrated). The CPU executes program data included in the ROM, using the RAM to control the component modules included in the image processing apparatus 300. Further, the RAM included in the control unit 307 holds counter values for recording the numbers of output color images and output monochrome images. The counter values are counted up every time the printing unit 306 performs processing of printing one page according to a color/monochrome determination result, which will be described in detail below. Based on the counter values, the numbers of printed color images and printed monochrome images can be recorded.

Figure 4:
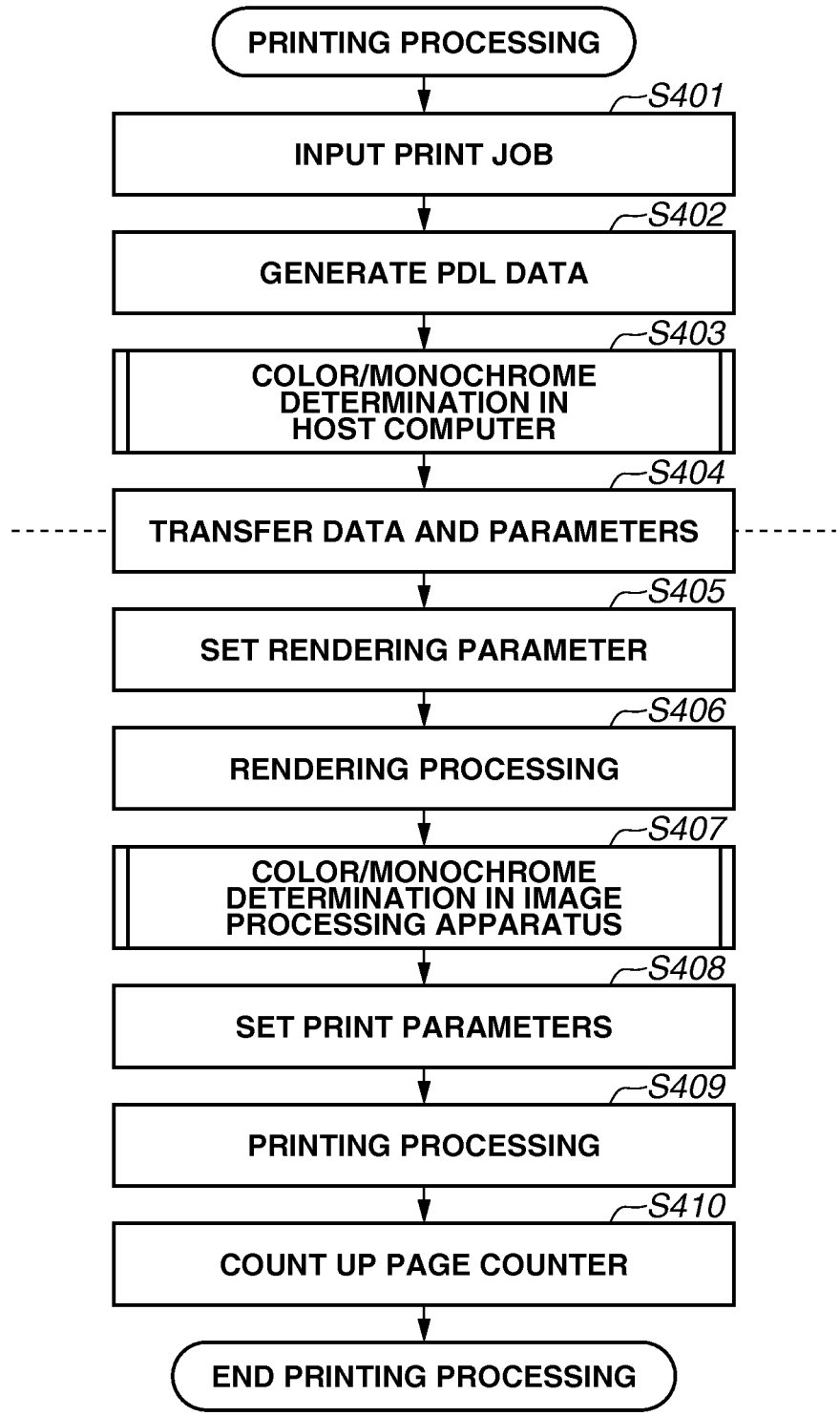
FIG. 4 is a flow chart illustrating an example of a processing flow of printing processing.

FIG. 4 is a flow chart illustrating a processing flow of a print job in the present exemplary embodiment. In the flow of the printing processing, steps S401 to S404 (the steps on and above a dotted line in FIG. 4) represent the processing performed by the host computer 200. Further, steps S404 to S410 (the steps on and below the dotted line in FIG. 4) represent the processing performed by the image processing apparatus 300. The processing performed by the host computer 200 is achieved as follows. The host computer 200 includes a CPU (not illustrated), a ROM (not illustrated), a hard disk drive (HDD)(not illustrated), and a RAM (not illustrated), and the CPU executes a program stored in the ROM or the HDD and loaded into the RAM, whereby the CPU functions as the components illustrated in FIG. 2. Further, the processing performed by the image processing apparatus 300 is achieved as follows. The CPU of the control unit 307 executes a program loaded into the RAM of the control unit 307, whereby the control unit 307 controls the components. Alternatively, the processing performed by the image processing apparatus 300 may also be achieved by the CPU of the control unit 307 functioning as the components illustrated in FIG. 3.

First, in step S401, the application control unit 202 of the host computer 200 instructs the driver control unit 203 to execute a print job so as to print a document image generated by the application control unit 202. The document image is generated in a format according to each application. Next, in step S402, the driver control unit 203 converts the document image into PDL data that can be interpreted by the image processing apparatus 300. At this time, the document image is converted into PDL data in a format according to the type of the driver (PostScript (PS), Printer Command Language (PCL), or Laser beam printer Image Processing System (LIPS)). In step S403, the driver control unit 203 makes color/monochrome determination of the converted PDL data. This processing will be described in detail below.

In step S404, the driver control unit 203 collectively transfers pieces of data such as the generated PDL data, image processing parameters, and a color/monochrome determination result from the communication control unit 204 to the image processing apparatus 300 via the network 201. The color/monochrome determination result refers to the result of the color/monochrome determination made in step S403. The determination processing will be described below. The color/monochrome determination result to be sent at this time is information indicating whether the PDL data is color or monochrome, but the information indicating whether the PDL data is color or monochrome does not necessarily need to be sent. For example, in a case where the printer driver and the image processing apparatus 300 have such an arrangement that only if the PDL data is monochrome, information indicating that the PDL data is monochrome is sent, only information indicating that the PDL data is monochrome is sent as the color/monochrome determination result. That is, in a case where information indicating that the PDL data is monochrome has been sent with the PDL data, the image processing apparatus 300 may determine that the sent PDL data is monochrome. Further, in a case where information indicating that the PDL data is monochrome has not been sent with the PDL data, the image processing apparatus 300 may determine that the sent PDL data is color. As a matter of course, conversely, the printer driver and the image processing apparatus 300 may have such an arrangement that only information indicating that the PDL data is color is sent. In short, as the above color/monochrome determination result, the case where no information is sent may also be considered to be equivalent to the case where the determination result is sent.

Next, a description will be given of the processing performed by the image processing apparatus 300 having received the pieces of data such as the PDL data, the image processing parameters, and the color/monochrome determination result. In step S404, the image processing apparatus 300 receives, by the communication control unit 301, the data transferred via the network 201, and stores the data in the RAM included in the control unit 307.

In step S405, the control unit 307 sets, among the received image processing parameters, a parameter related to rendering processing, where the set attribute may be utilized with respect to the rendering unit 302 and the monochrome/color determination unit 303. The parameter related to the rendering processing corresponds to, for example, attribute information indicating the attribute of an object, which will be described below. After the parameter has been set, then in step S406, the rendering unit 302 performs the rendering processing on the received PDL data. This converts the PDL data into bitmap image data.

Next, in step S407, the monochrome/color determination unit 303 performs color/monochrome determination processing using the bitmap image data converted by the rendering unit 302. The processing will be described in detail below. Then, in step S408, the control unit 307 sets parameters related to the printing processing in the color space conversion unit 304, the halftone processing unit 305, and the printing unit 306. These parameters include parameters generated based on the color/monochrome determination result of the determination made by the host computer 200 in step S403, a gray compensation flag described below, and the color/monochrome determination result of the determination made by the monochrome/color determination unit 303 in step S407. Further, the parameters include other parameters received from the host computer 200.

In step S409, after the color space conversion unit 304 and the halftone processing unit 305 have performed image processing, the printing unit 306 performs the printing processing on the bitmap image. Finally, in step S410, based on the color/monochrome determination results in steps S403 and S407, the control unit 307 counts up the value of either of color and monochrome page counters, and ends the printing processing.

Figure 5:
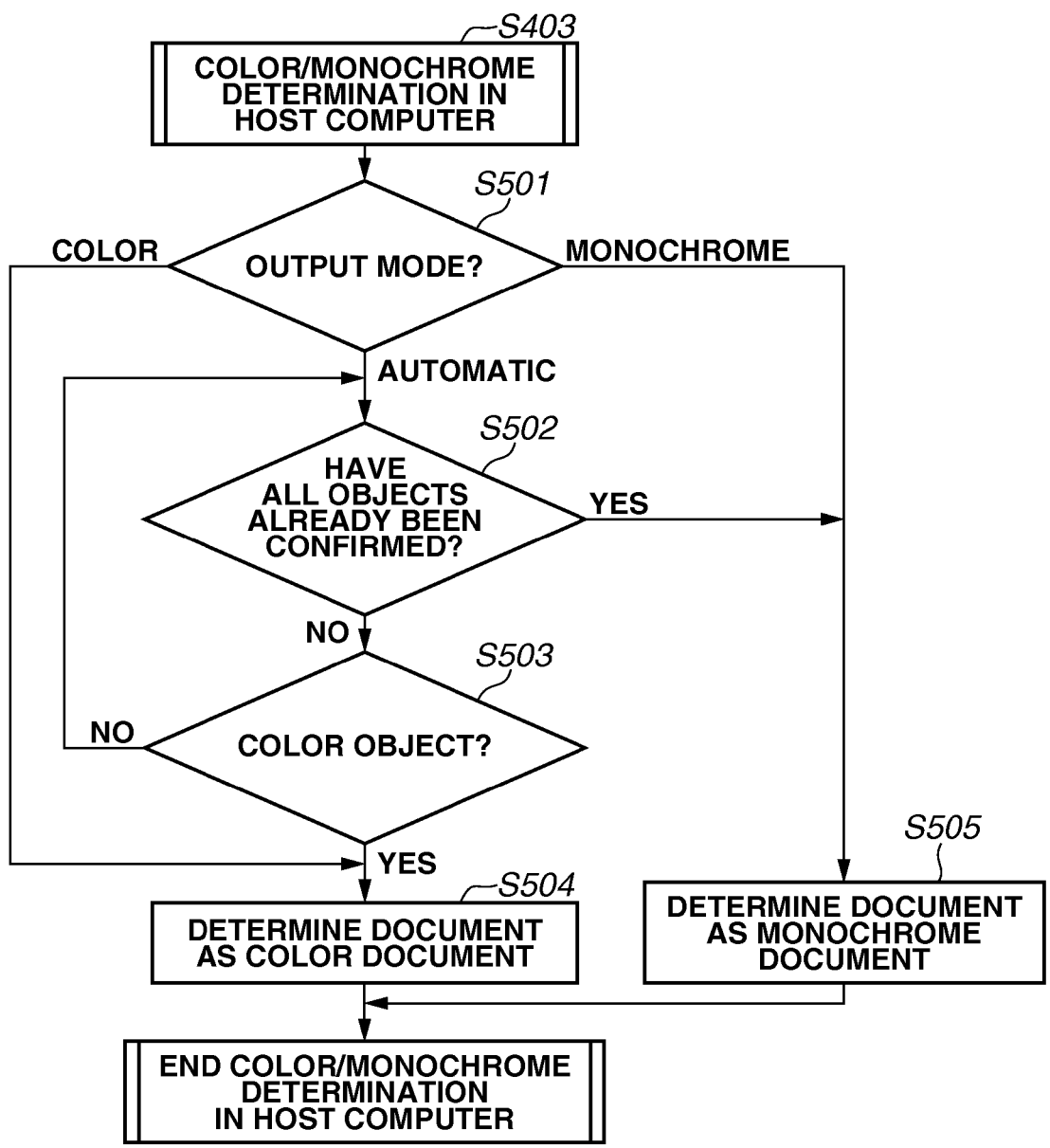
FIG. 5 is a flow chart illustrating an example of a processing flow of color/monochrome determination processing of an image, performed in the host computer.

FIG. 5 is a flow chart illustrating the details of the processing in the color/monochrome determination processing in step S403 on the host computer 200 side. The following processing is performed by the driver control unit 203.

First, in step S501, the driver control unit 203 confirms an output mode setting made by a user. The output mode setting refers to the setting of the color mode of the document image to be printed. The setting of the color mode includes, for example, three types of settings such as (1) color, (2) monochrome, and (3) automatic determination. The user can specify any one of the settings through a user interface (UI) of the printer driver. At this time, if "color" has been set, the document to be printed from the document image is determined as a color document. In other words, the document to be printed from the document image is determined to be a color document. If "monochrome" has been set, the document to be printed from the document image is determined as a monochrome document. If "automatic determination" has been set, the printer driver confirms objects in the document image to automatically determine whether the document to be printed from the document image is a color document or a monochrome document. The processing flow will be described below.

If the output mode is set to "color" ("COLOR" in step S501), the processing proceeds to step S504. In step S504, the driver control unit 203 determines all the pages as a color document. If the output mode is set to "monochrome" ("MONOCHROME" in step S501), the processing proceeds to step S505. In step S505, the driver control unit 203 determines all the pages as a monochrome document.

If, on the other hand, the output mode is set to "automatic determination" ("AUTOMATIC" in step S501), then in step S502, the driver control unit 203 confirms objects in the generated PDL data, makes color/monochrome determination of each object, and makes color/monochrome determination of each page. If all the objects in the page have already been confirmed in step S502, that is, if a color object is not included in the page (Yes in step S502), the processing proceeds to step S505. In step S505, the driver control unit 203 determines the document image on the page as a monochrome document. If there are objects that have not yet been confirmed (No in step S502), then in step S503, the driver control unit 203 determines, based on the PDL data, whether the objects are color objects. If at least one of the objects is a color object (Yes in step S503), the processing proceeds to step S504. In step S504, the driver control unit 203 determines the document image to be printed as a color document. If the objects are not color objects (No in step S503), the processing returns to step S502. In step S502, the driver control unit 203 makes color/monochrome determination of all the objects. The technique for sending the color/monochrome determination result obtained like this has been described above.

FIG. 6 is a diagram illustrating the relationships between the setting of the output mode, and the result of the color/monochrome determination in step S403 in the host computer 200, and the result of the color/monochrome determination in step S407 in the image processing apparatus 300, which will be described in detail below. In the present exemplary embodiment, if the output mode is set to "color" (*1 in the table), the determination of whether the document image is a color document or a monochrome document is left to the color/monochrome determination in the image processing apparatus 300 at the subsequent stage. Further, if the output mode is set to "automatic determination" and the host computer 200 has determined the document image as a color document (*1 in the table), the determination of whether the document image is a color document or a monochrome document is left to the color/monochrome determination in the image processing apparatus 300 at the subsequent stage. Thus, in these cases (the cases of *1), the determination result of the color/monochrome determination in step S407 in the image processing apparatus 300 is valid. If, on the other hand, the output mode is set to "monochrome" (*2 in the table), the document image is treated as a monochrome document in step S403 and all the subsequent steps. Further, if the output mode is set to "automatic determination" and the host computer 200 has determined the document image as a monochrome document (*2 in the table), the document image is treated as a monochrome document in step S403 and all the subsequent steps. That is, in these cases (the cases of *2), the determination result of the color/monochrome determination in step S407 in the image processing apparatus 300 is invalid. Thus, if the printer driver has determined the document image as a monochrome document, the processing in step S407 of FIG. 4 may be skipped.

Figure 7:
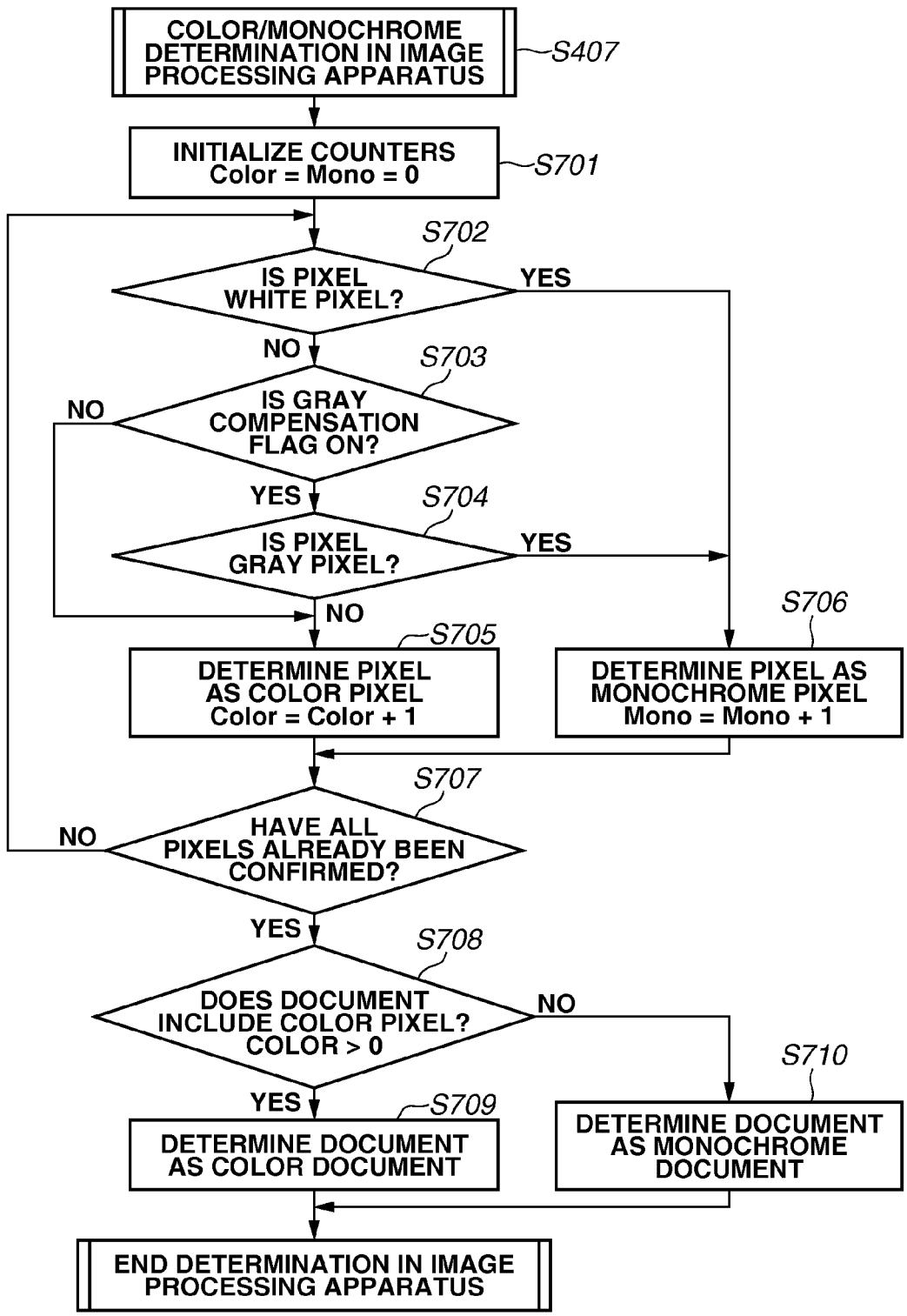
FIG. 7 is a flow chart illustrating an example of a processing flow of color/monochrome determination processing of an image, performed in the image processing apparatus.

FIG. 7 is a flow chart illustrating the details of the processing in the color/monochrome determination in step S407 in the image processing apparatus 300, which plays a central role in the present exemplary embodiment. The following processing is performed by the monochrome/color determination unit 303.

First, in step S701, the monochrome/color determination unit 303 initializes counters for counting color pixels and monochrome pixels in the bitmap image data on each page. Next, in step S702 and the subsequent steps, the monochrome/color determination unit 303 makes color/monochrome determination of each pixel in the input bitmap image data. Initially, in step S702, the monochrome/color determination unit 303 determines whether a focused pixel in the image is a white pixel. The determination of whether the focused pixel is a white pixel is made as follows. For example, in the case of 8-bit RGB image data, a pixel in which R=G=B=255 is determined as a white pixel. If the focused pixel is a white pixel (Yes in step S702), the processing proceeds to step S706. In step S706, the monochrome/color determination unit 303 determines the focused pixel as a monochrome pixel, and increments the monochrome pixel counter. If, on the other hand, the focused pixel is not a white pixel (No in step S702), the processing proceeds to step S703. In step S703, the monochrome/color determination unit 303 determines whether a gray compensation flag of the focused pixel is on.

The gray compensation flag will be described here. The gray compensation flag refers to a flag indicating whether gray compensation is set. The gray compensation setting is image processing setting made by the user for the driver control unit 203, and is made to set whether the pixel determined as a gray pixel is to be represented by a single K color or represented by four CMYK colors. The gray compensation setting can be made with respect to each object type such as image, graphic, or text. If the gray compensation flag is on, gray compensation is made. That is, the pixel determined as a gray pixel is represented by a single K color. If the gray compensation flag is off, gray compensation is not made. That is, the pixel determined as a gray pixel is represented by four CMYK colors. In a normal driver, gray compensation is often set to off for an image object, and gray compensation is often set to on for graphic and text objects. That is, gray compensation is often set to off for a photograph pixel, and is often set to on for a graphic pixel and a text pixel. Based on such settings, a gray color of an image object is represented by four CMYK colors and thereby can represent a rich impression of color. A gray color of a graphic object or a text object is represented by a single K color and thereby can reduce the thickening and the blurring of a line. Further, the initial setting value of the gray compensation setting with respect to each object type may vary depending on the driver. The gray compensation setting thus made with respect to each object type is converted into the gray compensation flag of each pixel, and the gray compensation flag is added to the pixel, when the rendering unit 302 converts the PDL data into a bitmap image. Then, the gray compensation flag is used for the determination by the monochrome/color determination unit 303 at the subsequent stage.

Taking a white rectangular object as an example, a description will be given of the difference between the case where the attribute of the object type is "graphic" and the case where the attribute of the object type is "image". As described above, the driver control unit 203 generates PDL data based on the data transferred from the application control unit 202. At this time, if the data transferred from the application control unit 202 is a so-called white rectangular figure, the driver control unit 203 generates PDL data defining the vertex positions and the lengths of the rectangle. The rendering unit 302 of the image processing apparatus 300 analyzes the PDL data and adds "graphic" as the attribute of the PDL data. If, on the other hand, the data transferred from the application control unit 202 is so-called bitmap (BMP) or Joint Photographic Experts Group (JPEG) image data, the driver control unit 203 generates PDL data indicating such image data. The rendering unit 302 of the image processing apparatus 300 analyzes the PDL data and adds "image" as the attribute of the PDL data.

Referring back to the flow chart in FIG. 7, the description will be continued. If the gray compensation flag of the focused pixel is off in step S703 (No in step S703), the focused pixel is represented by four CMYK colors by the color space conversion unit 304 at the subsequent stage. Thus, the processing proceeds to step S705. In step S705, the monochrome/color determination unit 303 determines the focused pixel as a color pixel, and increments the color pixel counter.

If, on the other hand, the gray compensation flag of the focused pixel is on (Yes in step S703), the processing proceeds to step S704. In step S704, the monochrome/color determination unit 303 determines whether the focused pixel is a gray pixel. In other words, the monochrome/color determination unit 303 determines whether the focused pixel constitutes a gray text. The determination of whether the focused pixel is a gray pixel is made as follows. For example, in the case of an RGB image, a pixel of R=G=B is determined as a gray pixel. The other pixels are determined as not gray pixels. If the gray compensation flag is on, and the focused pixel is a gray pixel (Yes in step S704), the focused pixel, which is a gray pixel, is represented by a single K color. Thus, the processing proceeds to step S706. In step S706, the monochrome/color determination unit 303 determines the focused pixel as a monochrome pixel, and increments the monochrome pixel counter. If the focused pixel is not a gray pixel (No in step S704), the processing proceeds to step S705. In step S705, the monochrome/color determination unit 303 determines the focused pixel as a color pixel, and increments the color pixel counter. In step S707, the monochrome/color determination unit 303 determines whether the above determination processing has been performed on all the pixels included in the rendered bitmap image data on one page. If there is a pixel that has not been subjected to the above determination processing (No in step S707), the above determination processing is repeated by setting the pixel that has not been subjected to the above determination processing as a focused pixel.

If all the pixels have been subjected to the above determination processing (Yes in step S707), then in step S708, the monochrome/color determination unit 303 determines, based on the counted values of the color pixel counter and monochrome pixel counter, whether the image on the one page includes a color pixel. For example, in the present exemplary embodiment, if the color pixel counter indicates a value equal to or greater than 1 (Yes in step S708), then in step S709, the monochrome/color determination unit 303 determines the document image on this page as a color document. In other cases (No in step S708), in step S710, the monochrome/color determination unit 303 determines the document image on this page as a monochrome document. According to the result of step S709 or S710, it is determined whether this page has been subjected to color printing or monochrome printing.

In the present exemplary embodiment, the monochrome/color determination unit 303 makes color/monochrome pixel determination of all the pixels on one page, and then makes color/monochrome document determination based on the resulting pixel counters. The determination method, however, is not limited to such a method. More specifically, the method may be such that if at least one color pixel has been detected, the monochrome/color determination unit 303 does not make determination processing thereafter, or the CPU of the control unit 307 performs the processes in step S708 and the subsequent steps. The former can reduce the amount of processing when software performs the processing while the latter can flexibly change an algorithm of the color/monochrome document determination based on the color and monochrome pixel counters.

Further, the above processing has been described taking as an example a technique for providing counters and counting up the respective counter values of color pixels and monochrome pixels. However, since it is only necessary to identify whether the document on each page is a color document or a monochrome document, for example, 1-bit flag data may be used. More specifically, the technique may be such that a monochrome printing flag is set as an initial setting, and if a focused pixel has been determined as a color pixel in the above color/monochrome determination processing in the image processing apparatus 300, a color printing flag is set.

FIG. 8 illustrates a table indicating the determination results of the color/monochrome pixel determination made based on the pixel value and the gray compensation flag, in the color/monochrome pixel determination in step S407. In the above determination processing in step S407, a white pixel is determined as a monochrome pixel regardless of the gray compensation flag. This is because, if the focused pixel is determined as a white pixel in step S702, the focused pixel is immediately determined as a monochrome pixel without performing the subsequent determination processing using the gray compensation flag and the like. In the present exemplary embodiment, if the focused pixel is a white pixel, the focused pixel is determined as a monochrome pixel. This can prevent a document image including only a white image, for example, from being determined as a color image. Further, in the determination processing in step S407, a color pixel is determined as a color pixel regardless of the gray compensation flag. At this time, a color pixel refers to a pixel other than a white pixel (R=G=B=255), a gray pixel (R=G=B), and a black pixel (R=G=B=0).

On the other hand, each of a gray pixel and a black pixel is determined as a monochrome pixel if the gray compensation flag is on, or is determined as a color pixel if the gray compensation flag is off. That is, in the case of an object type (e.g., "text" or "graphic") for which gray compensation is set (is on), each of a gray pixel and a black pixel is determined as a monochrome pixel. In the case of an object type (e.g., "image" or an object having no attribute) for which gray compensation is not set (is off), each of a gray pixel and a black pixel is determined as a color pixel.

Figure 1:
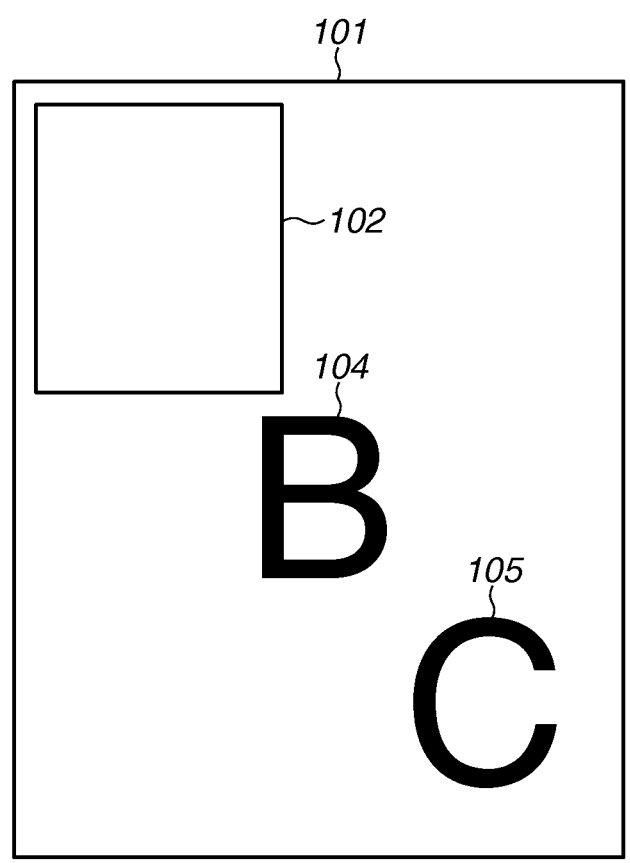
FIG. 1 is a diagram illustrating an example where an unfavorable color printing fee is charged.

According to the determination flow as described above, a description will be given of a determination flow in a case where, for example, a print job of an image as illustrated in FIG. 1 has been input with the output mode set to "color". First, in the host computer 200, since the output mode is set to "color", the document to be printed from the image is determined as a color document in the processing of step S403. Next, in the image processing apparatus 300, since a pixel in a white image object 102 is a white pixel, the pixel is determined as a monochrome pixel regardless of the setting of the gray compensation flag. Further, in each of black text objects 104 and 105, the setting of the gray compensation flag, which is set to on for a text portion, is valid. Thus, pixels in the black text objects 104 and 105 are also determined as monochrome pixels. As a result, the image in FIG. 1 is determined as a monochrome image.

As described above, gray compensation is often set to off for the attribute "image" to represent a rich impression of color. Consequently, in the case as illustrated in FIG. 1, although the white image object 102 is not subjected to color printing, the pixel in the white image object 102 is determined as a color pixel. As a result, a color printing fee has been charged. According to the present exemplary embodiment, the discrepancy between the appearance of a document image as illustrated in FIG. 1 and the color/monochrome determination result of the document image can be resolved.

In the example illustrated in FIG. 1, if the output mode is set to "automatic determination", a monochrome printing fee is charged even according to a conventional technique. This is because, in the color/monochrome determination processing in the host computer 200 (step S403), the objects are determined as non-color objects, and therefore, the image is treated as a monochrome document in the subsequent processing.

Figure 9:
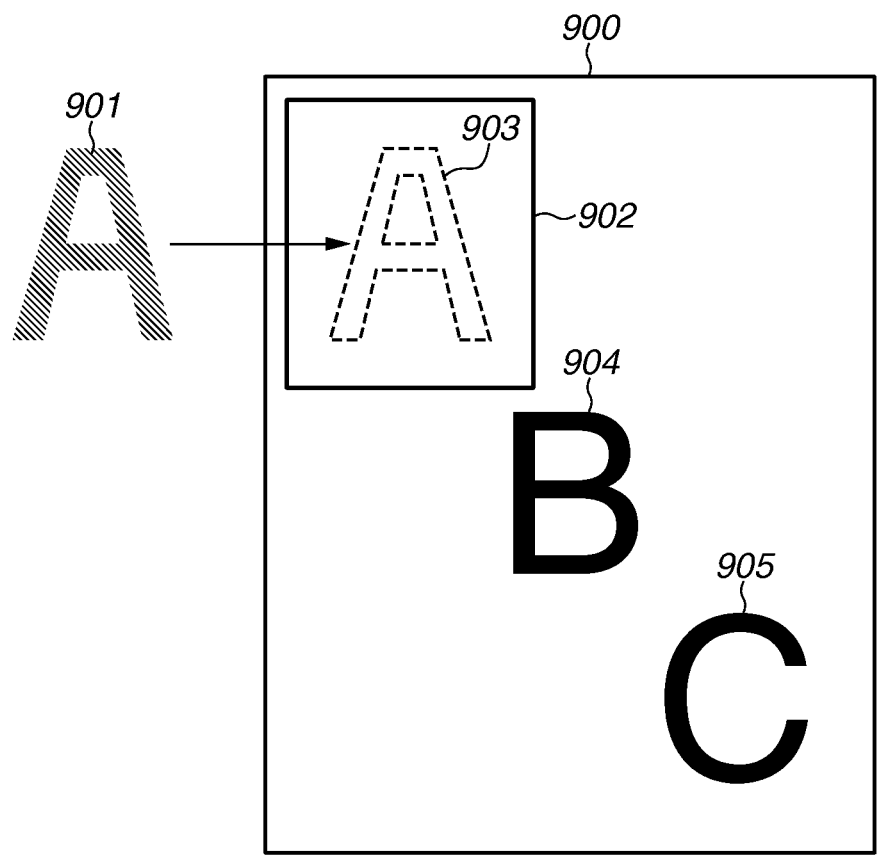
FIG. 9 is a diagram illustrating another example where an unfavorable color printing fee is charged.

FIG. 9 illustrates another example. FIG. 9 illustrates a document image 900, in which a white image object 902 (although the frame line of the image object 902 is represented in black for illustrative purposes, the image object 902 is actually white) is superimposed on a color text object 901. An object 903 defined by dashed lines indicates that the color text object 901 cannot be seen behind the white image object 902. In the case of a document image as illustrated in FIG. 9, even if the output mode of the printer driver is set to "automatic determination", a color printing fee is charged according to a conventional technique, despite the fact that there is no pixel to be printed in color. That is, the color text object 901 is placed behind the white image object 902 and therefore is not printed. Further, in the white image object 902, R=G=B=255. Thus, the values after CMYK conversion are C=M=Y=K=0. Accordingly, there is no pixel to be printed in color.

Even in the case of a document image as illustrated in FIG. 9, according to the processing of the present exemplary embodiment, a monochrome printing fee is charged for the document image 900 even if the output mode is set to "automatic determination" or "color".

This case will be specifically described. A description will be given of a determination flow in a case where a print job of a document image as illustrated in FIG. 9 has been input with the output mode set to "automatic determination". First, in the host computer 200, as a result of the processing of the color/monochrome determination processing in the host computer 200 (step S403), the image is determined as including a color object and therefore the document to be printed from the image is determined as a color document. Also in a case where the output mode is set to "color", the document to be printed from the image is similarly determined as a color document. Next, in the image processing apparatus 300, an image portion where the white image object 902 is superimposed on the color text object 901 is white also in the rendered bitmap data. Thus, a pixel in the image portion is determined as a monochrome pixel regardless of the setting of the gray compensation flag. Further, in each of black text objects 904 and 905, the setting of the gray compensation flag, which is set to on for a text portion, is valid. Thus, pixels in the black text objects 904 and 905 are also determined as monochrome pixels. As a result, the document image 900 in FIG. 9 is determined as a monochrome image.

As described above, according to the processing of the present exemplary embodiment, the discrepancy between the appearance of a document image as illustrated in FIG. 9 and the color/monochrome determination result of the document image can be resolved.

In the first exemplary embodiment, an example has been illustrated where strict determination is made in each type of determination including the white pixel determination (step S702), the gray pixel determination (step S704), and the color/monochrome document determination (step S708) in the color/monochrome determination (step S407) in the image processing apparatus 300. More specifically, in the white pixel determination processing in step S702, an example has been illustrated where, for an 8-bit RGB image, only a pixel in which R=G=B=255 is determined as a white pixel. Further, in the gray pixel determination processing in step S704, an example has been illustrated where only a pixel in which R=G=B is determined as a gray pixel. Further, in the color/monochrome document determination processing in step S708, an example has been illustrated where, if there is at least one color pixel, the document to be printed from the document image is determined as a color document.

It is, however, easier to obtain effects by allowing determination using certain thresholds rather than by making strict determination, so long as the purpose of resolving the discrepancy between the appearance of an image and the color/monochrome determination result of the image is accomplished.

For example, in the white pixel determination processing in step S702, if a pixel to be printed in a color similar to white is determined as a monochrome pixel, the discrepancy between the appearance of an image and the color/monochrome determination result of the image is further resolved. Thus, while a pixel in which R=G=B=255 is determined as a white pixel in the first exemplary embodiment, a predetermined threshold TH1 (e.g., TH1=252) may be alternatively used to determine a pixel in which R≥TH1, G≥TH1, and B≥TH1 as a white pixel. Similarly, in the gray pixel determination processing in step S704, while only a pixel in which R=G=B is determined as a gray pixel in the first exemplary embodiment, a predetermined threshold TH2 (e.g., TH2=3) may be alternatively used to determine a pixel in which |R−G|≤TH2, |G−B|≤TH2, and |B−R|≤TH2 as a gray pixel. Further, in the color/monochrome document determination processing in step S708 as well, while a document to be printed from the document image which includes at least one color pixel is determined as a color document in the first exemplary embodiment, a predetermined threshold TH3 (e.g., 30) may be alternatively used to determine a document image in which the number of color pixels >TH3 as a color document. If a flag is used, the technique may be such that a color flag is set when the threshold TH3 has been exceeded.

As described above, providing a mechanism for allowing latitude in determination using a threshold in each determination process, and setting an appropriate threshold can further resolve the discrepancy between the appearance of an image and the color/monochrome determination result of the image. Further, if a threshold is made variable, it is possible to construct a flexible color/monochrome determination system.

Further, an exemplary embodiment of the present invention is achieved also by performing the following processing. More specifically, an exemplary embodiment of the present invention is achieved by performing the processing of supplying software (a program) for achieving the functions of the above exemplary embodiments to a system or an apparatus via a network or various storage media, and of causing a computer (or a CPU or a microprocessor unit (MPU)) of the system or the apparatus to read and execute the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007915 filed Jan. 20, 2014, which is hereby incorporated by reference herein in its entirety.

What is claimed is:

1. An image processing apparatus comprising:
a memory storing instructions; and
one or more processors which execute the instructions and cause the image processing apparatus to function as:
a white pixel determination unit configured to determine whether each of a plurality of pixels in an input image is a white pixel;
a gray pixel determination unit configured to determine whether each of the plurality of pixels in the input image is a gray pixel; and
a gray representation determination unit configured to determine, for each of the plurality of pixels in the input image, whether a setting in which gray is represented by a single K color has been made; and
a setting unit configured (i) to set a black-and-white printing flag for a pixel which is determined to be a white pixel by the white pixel determination unit, (ii) to set the black-and-white printing flag for a pixel which is determined to be not a white pixel by the white pixel determination unit, is determined that the setting in which gray is represented by a single K color has been made by the gray representation determination unit, and is determined to be a gray pixel by the gray pixel determination unit, and (iii) to set a color printing flag for a pixel which is determined to be not a white pixel by the white pixel determination unit and is determined that the setting in which gray is represented by a single K color has not been made by the gray representation determination unit.

2. The image processing apparatus according to claim 1, wherein the input image is an RGB (Red, Green, Blue) image, the image processing apparatus further comprising:
a conversion unit configured to convert RGB values of a pixel for which the black-and-white printing flag has been set into CMYK (Cyan, Magenta, Yellow, Black) values in which C=M=Y=0, and to convert RGB values of a pixel for which the color printing flag has been set into CMYK values in which at least one of the C, M, and Y values is greater than 0, except in a case where R=G=B=0.

3. The image processing apparatus according to claim 2, further comprising a printing unit configured to print an image obtained by the conversion performed by the conversion unit.

4. The image processing apparatus according to claim 2, wherein a pixel in which each of the RGB values is 255 is determined to be a white pixel.

5. The image processing apparatus according to claim 2, wherein a pixel in which all of the RGB values exceed a predetermined threshold is determined to be a white pixel.

6. The image processing apparatus according to claim 1, wherein the gray pixel determination unit determines that a pixel in the input image, in which R=G=B, is a gray pixel.

7. The image processing apparatus according to claim 1, wherein the gray pixel determination unit determines that a pixel in the input image, in which a difference between R and G is smaller than a RG threshold, a difference between G and B is smaller than a GB threshold, and a difference between B and R is smaller than a BR threshold, is a gray pixel.

8. An image processing apparatus comprising:
at least one processor coupled to a memory;
a white pixel determination unit configured to determine whether each pixel in an image is a white pixel;
a chrome pixel determination unit configured to determine whether each pixel in the image is a black-and-white pixel or a color pixel;
an attribute determination unit configured to determine whether each pixel in the image belongs to a photograph object or a text object; and
a setting unit configured to set a printing flag,
wherein, in a case where the white pixel determination unit determines that a focused pixel is a white pixel, the setting unit sets a black-and-white printing flag for the focused pixel regardless of determination results of the focused pixel by the chrome pixel determination unit and/or the attribute determination unit,
wherein, in a case where the white pixel determination unit determines that the focused pixel is not a white pixel, the setting unit sets a color printing flag for the focused pixel in a case where the chrome pixel determination unit determines that the focused pixel is a black-and-white pixel, and the attribute determination unit determines that the focused pixel belongs to a photograph object,
wherein, in a case where the white pixel determination unit determines that the focused pixel is not a white pixel, the setting unit sets the black-and-white printing flag for the focused pixel in a case where the chrome pixel determination unit determines that the focused pixel is a black-and-white pixel, and the attribute determination unit has determined that the focused pixel belongs to a text object, and
wherein at least one of the white pixel determination unit, the chrome pixel determination unit, the attribute determination unit, and the setting unit is implemented by the at least one processor.

9. A method for an image processing apparatus, the method comprising:
determining whether each of a plurality of pixels in an input image is a white pixel;
determining whether each of the plurality of pixels in the input image is a gray pixel; and
determining, for each of the plurality of pixels in the input image, whether a setting in which gray is represented by a single K color has been made; and
(i) setting a black-and-white printing flag for a pixel which is determined to be a white pixel, (ii) setting the black-and-white printing flag for a pixel which is determined to be not a white pixel, is determined that the setting in which gray is represented by a single K color has been made, and is determined to be a gray pixel, and (iii) setting a color printing flag for a pixel which is determined to be not a white pixel and is determined that the setting in which gray is represented by a single K color has not been made.

10. A non-transitory computer-readable storage medium storing a program to cause an image processing apparatus to perform a method, the method comprising:
determining whether each of a plurality of pixels in an input image is a white pixel;
determining whether each of the plurality of pixels in the input image is a gray pixel; and
determining, for each of the plurality of pixels in the input image, whether a setting in which gray is represented by a single K color has been made; and
(i) setting a black-and-white printing flag for a pixel which is determined to be a white pixel, (ii) setting the black-and-white printing flag for a pixel which is determined to be not a white pixel, is determined that the setting in which gray is represented by a single K color has been made, and is determined to be a gray pixel, and (iii) setting a color printing flag for a pixel which is determined to be not a white pixel and is determined that the setting in which gray is represented by a single K color has not been made.

* * * * *